US006108884A

United States Patent [19]
Castleman et al.

[11] Patent Number: 6,108,884
[45] Date of Patent: Aug. 29, 2000

[54] INSERTION TOOL

[75] Inventors: Dennis J. Castleman, Monroeville, Ind.; Sean P. Ford, Van Wert, Ohio

[73] Assignee: Aeroquip Corporation, Maumee, Ohio

[21] Appl. No.: 09/291,731

[22] Filed: Apr. 14, 1999

[51] Int. Cl.[7] .......... B23P 19/02
[52] U.S. Cl. .......... 29/235; 29/278; 29/280
[58] Field of Search .......... 29/235, 270, 271, 29/278, 229, 280, 426.6

[56] References Cited

U.S. PATENT DOCUMENTS

| | | |
|---|---|---|
| 3,145,463 | 8/1964 | Hockett . |
| 3,180,015 | 4/1965 | Thompson et al. . |
| 3,553,817 | 1/1971 | Lallak . |
| 3,704,505 | 12/1972 | Lacer, Jr. et al. . |
| 4,141,129 | 2/1979 | Martini . |
| 4,222,161 | 9/1980 | Duval et al. . |
| 4,571,804 | 2/1986 | Grabler et al. . |
| 4,845,822 | 7/1989 | Hutson . |
| 5,050,282 | 9/1991 | Zannini . |
| 5,138,752 | 8/1992 | Tasner . |
| 5,862,578 | 1/1999 | Castleman . |

FOREIGN PATENT DOCUMENTS

| | | |
|---|---|---|
| 0 137 907 | 4/1985 | European Pat. Off. . |
| 24 44 896 A1 | 9/1974 | Germany . |

OTHER PUBLICATIONS

G. Warnecke et al.: "Industrieroboter montiert kleine O–Ringe automatisch" VDI–Zeitschrift, vol. 133, No. 8, Aug. 1991, Dusseldorf, see figures 3,6.

*Primary Examiner*—Robert C. Watson
*Attorney, Agent, or Firm*—Emch, Schaffer, Schaub & Porcello, Co., L.P.A.

[57] ABSTRACT

An insertion tool for inserting a backup ring and an O-ring into a gland. The tool includes a body having a recess for containing the backup ring and the O-ring. The tool further includes a pusher movably mounted adjacent to the body. The pusher is moveable in a first direction and a second direction. The pusher includes a pulling device for pulling the backup ring and the O-ring in the first direction. The pusher further includes a pushing device for pushing the backup ring and the O-ring in the second direction into the gland.

8 Claims, 3 Drawing Sheets

INSERTION TOOL

BACKGROUND OF THE INVENTION

The present invention relates generally to an insertion tool for inserting a backup ring and an O-ring into a recess or gland of an adapter.

Prior insertion tools have included a body having a recess for containing and positioning a backup ring and an O-ring. A plunger or pusher is movably mounted on the body. The pusher includes a surface adapted to engage the backup ring and the O-ring. During use, the backup ring and the O-ring are positioned in the recess of the body. The body is then inserted into an opening of an adapter. The pusher engages the backup ring and the O-ring and pushes them into the gland of the adapter.

It has been found that the use of prior insertion tools can result in damage to the backup ring and the O-ring during use due to contact with the inside surface of the adapter. This damage includes abrasions that can reduce the future effectiveness of the rings.

There is a need for an improved insertion tool that minimizes the risk of damage to a backup ring and an O-ring during insertion into a gland, while having ease of use with rapid and efficient movement and consistent repeatability. The present invention satisfies this need.

SUMMARY OF THE INVENTION

The present invention is directed to an insertion tool for inserting a backup ring and an O-ring into a gland of an adapter or other receptacle. The insertion tool includes a body having a recess for containing the backup ring and the O-ring. The insertion tool further includes a pusher movably mounted adjacent to the body. The pusher is moveable in a first direction and a second direction.

The pusher includes a pulling device for pulling the backup ring and the O-ring in the first direction. The pusher further includes a pushing device for pushing the backup ring and the O-ring in the second direction into the gland of the adapter or other receptacle. The design of the insertion tool is such that it can, if desired, be used manually with ease and a minimum amount of strain on the user and with assurance of consistent repeatability.

The primary object of the present invention is to provide an insertion tool for inserting a backup ring and an O-ring into a gland without damage to the rings and to do so easily on a rapid basis with consistent repeatability.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
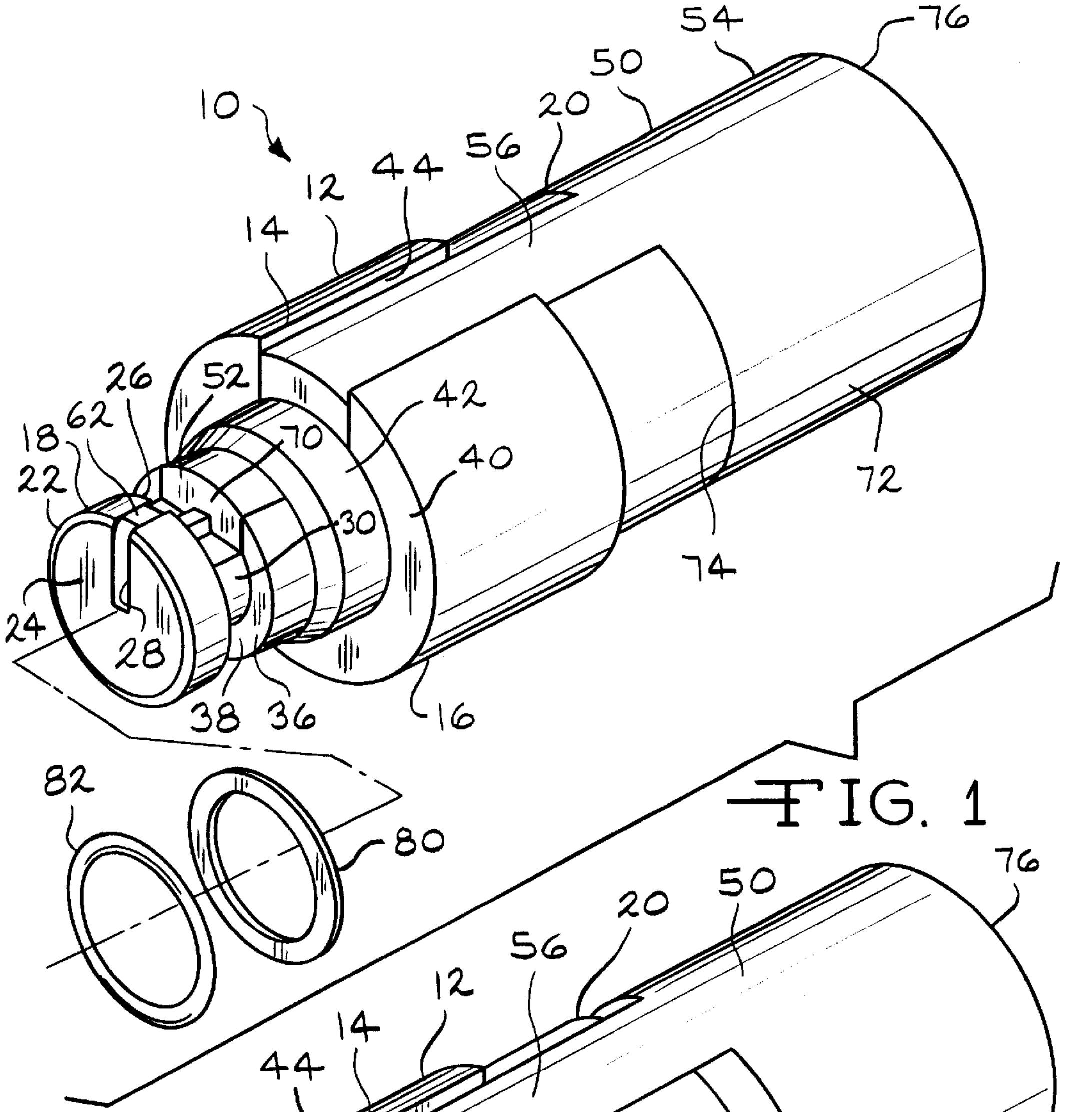
FIG. 1 is a perspective view of an insertion tool according to the present invention in which a backup and an O-ring are shown with respect to the tool.

The preferred embodiments and best mode of the present invention will now be described in detail with reference being made to the drawings. The insertion tool of the present invention is indicated generally in the drawings by the reference number "10".

Referring to FIGS. 1–4, the insertion tool 10 includes a cylindrical body 12 having a top 14, a bottom 16, a first end 18 and a second end 20. The first end 18 includes a cylindrical tip 22 having a flat outside surface 24 and an inclined inside surface 26. The tip 22 includes a slot 28 that extends between the outside and inside surfaces 24 and 26.

Figure 4:
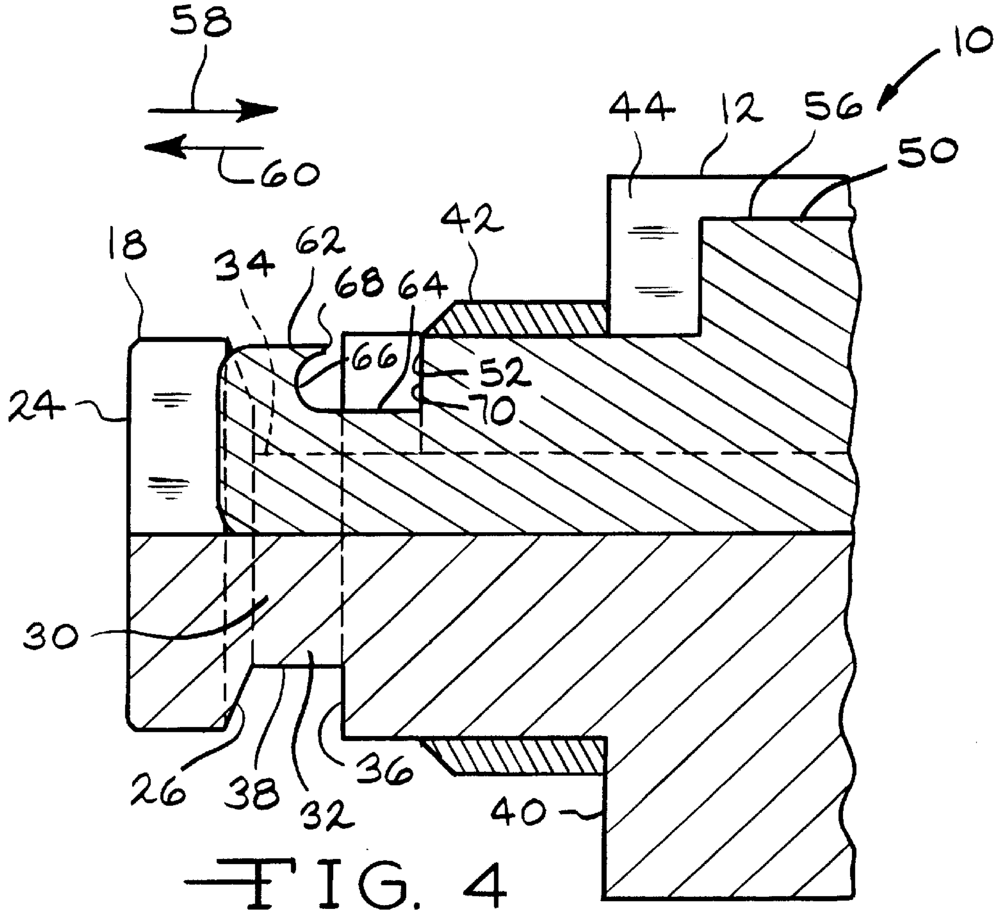
FIG. 4 is a cross-sectional view taken along line 4—4 of FIG. 3.

As best shown in FIG. 4, the first end 18 of the body 12 includes a neck 30 having a semicircular lower portion 32 and a flat upper surface 34. The neck extends between the inside surface 26 of the tip 22 and a flat wall 36 of the body 12. A recess 38 is formed by the inside surface 26, the neck 30 and the wall 36.

Figure 2:
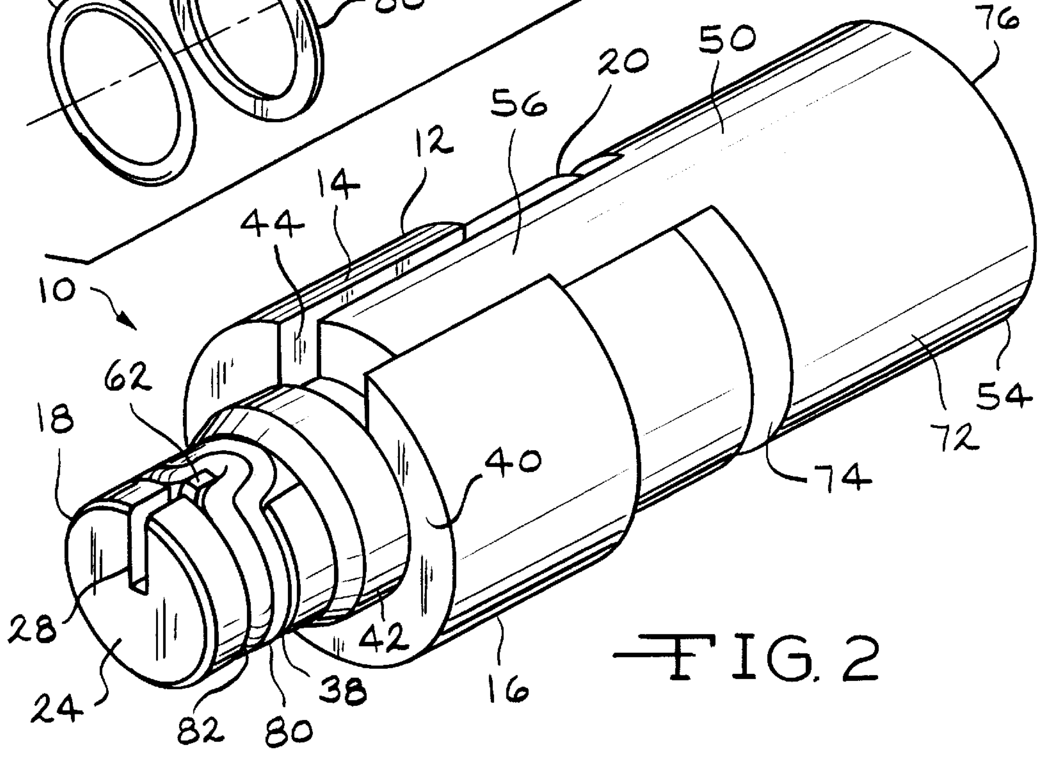
FIG. 2 is a perspective view similar to the view of FIG. 1 showing the backup ring and the O-ring positioned on the tool.

Still referring to FIGS. 1–4, the body 12 includes a flat annular shoulder 40. A cylindrical protective sleeve 42 is positioned on the body 12 adjacent to the annular shoulder 40. As best shown in FIGS. 1 and 2, the top 14 of the body 12 includes a channel 44 that extends longitudinally between the annular shoulder 40 and the second end 20.

Referring to FIGS. 1–4, the insertion tool 10 includes a pusher 50 having an engagement end 52 and an actuation end 54. The pusher 50 includes a center portion 56 that extends longitudinally between the engagement end 52 and actuation end 54. The center portion 56 is movably positioned in the channel 44 to allow the pusher 50 to be moveable in a first direction as indicated by arrow 58 in FIG. 4 and a second direction as indicated by arrow 60 in FIG. 4.

Figure 3:
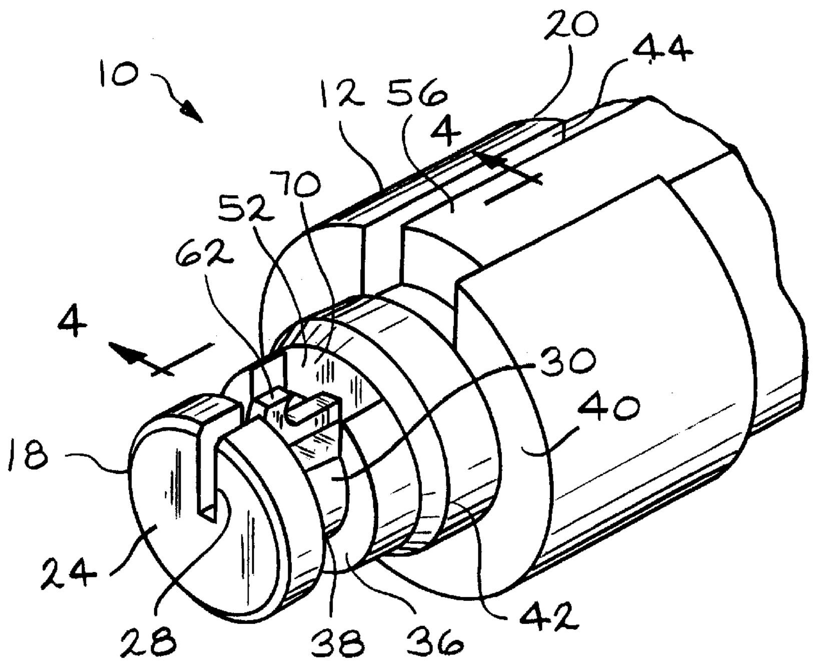
FIG. 3 is a detailed perspective view of the insertion tool of the present invention.

As shown in FIGS. 3 and 4, the engagement end 52 of the pusher 50 includes a hook 62 having a shank 64, a curved portion 66 and a point 68. The hook 62 can be detachably mounted on the pusher 50 by a roll pin (not shown) for replacement purposes. The engagement end 52 further includes a backup ring and an O-ring radius 70 spaced from the curved portion 66 and the point 68 of the hook 62. As shown in FIGS. 1, 3 and 4, the engagement end 52 is movably positioned adjacent to the first end 18 of the body 12.

Referring to FIGS. 1 and 2, the actuation end 54 of the pusher 50 includes a cylindrical portion 72 having a flat body surface 74 and a flat actuation surface 76. The actuation surface 76 can be adapted for connection with an actuation apparatus. The actuation end 54 can also be adapted for actuation by a hand.

The operation and intended use of the insertion tool 10 will now be described with reference being made to FIGS. 1–6. As shown in FIGS. 1 and 2, a conventional backup ring 80 and a conventional O-ring 82 are positioned in the recess 38 of the insertion tool 10. As shown in FIGS. 2 and 4, the hook 62 is moved in the first direction as indicated by arrow 58 so that the curved portion 66 engages the O-ring 82. The O-ring 82 then engages the backup ring 80. This allows the hook 62 to pull portions of the backup ring 80 and the O-ring 82 from the recess 38 as shown in FIG. 2. The pulling action of the hook 62 causes the backup ring 80 and the O-ring 82 to be pulled downwardly with respect to the body 12 and to become taut.

Figure 5:
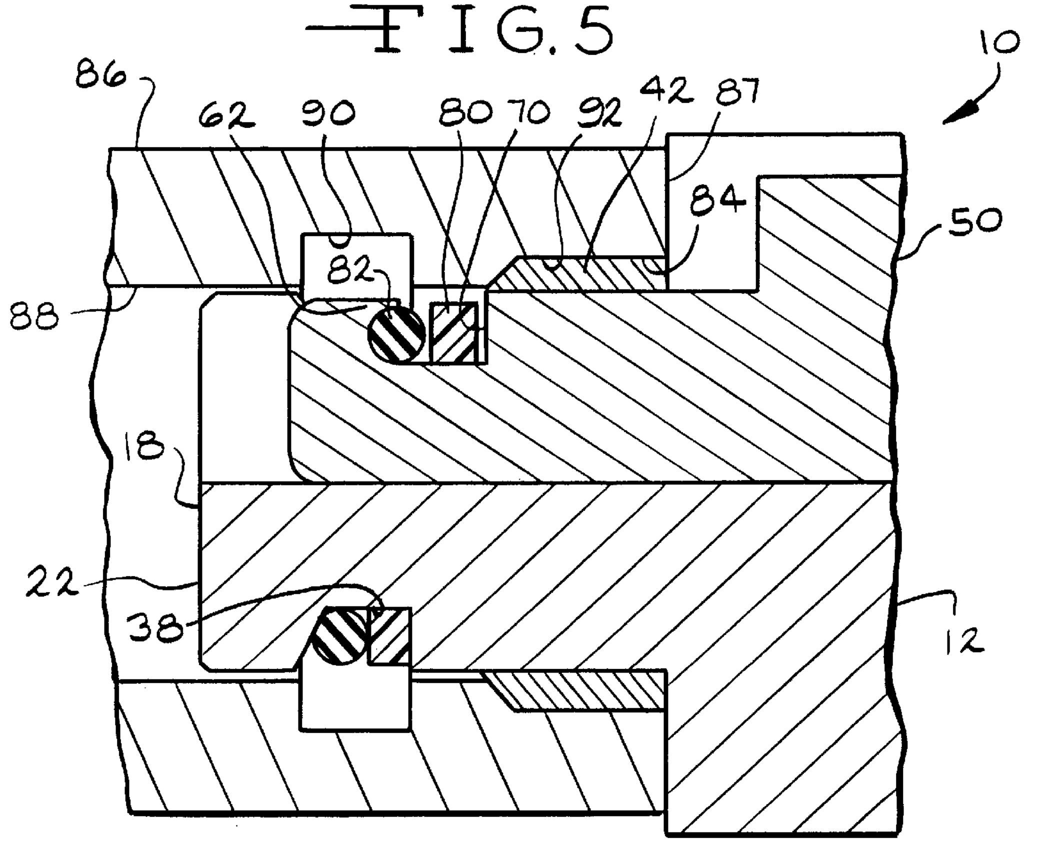
FIG. 5 is a detailed cross-section view taken through the center of the insertion tool of the present invention, a backup ring, an O-ring, and an adapter having a gland.
Figure 6:
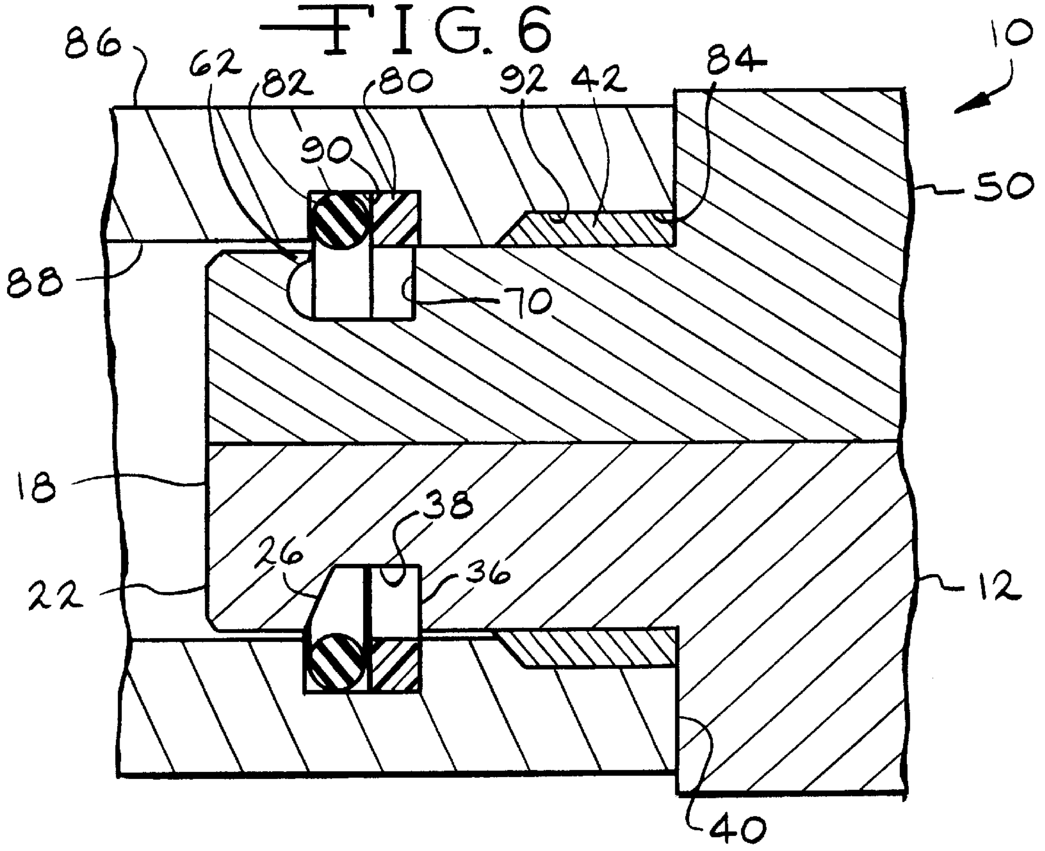
FIG. 6 is a view similar to FIG. 5 showing insertion of the backup ring and the O-ring into the gland.

As shown in FIG. 5, the insertion tool 10 is inserted into an opening 84 of an adapter 86 or other receptacle, which has an interior surface 88 that defines a recess or gland 90. The adapter 86 has an end face 87 encircling the opening 84 and a circular recess 92 between the end face 87 and interior surface 88. Due to the pulling action of the hook 62, the backup ring 80 and the O-ring 82 are positioned away from the interior surface 88 of the adapter 86. This reduces the risk of damage to the backup ring 80 and the O-ring 82. The insertion tool 10 is inserted into the adapter 86 until the annular shoulder 40 of the body 12 engages the end face 87, at which position those portions of the back up ring 80 and O-ring 82 positioned in the recess 38 of the body 12 will be axially aligned with the recess 90. Those portions of the back up ring 80 and O-ring 82 engaged by the hook 62 of the pusher 50 are not then aligned with the recess 90. A circular recess 92 is provided in the adapter 86 adjacent the end face 87 and is sized to receive the protective sleeve 42. As it will be appreciated, the protective sleeve 42 assists in centering and protects the body 12, pusher 50, the back up ring 80 and O-ring 82 from damage as a result of contact with the adapter 86 and its engagement with the circular recess 92 assists in centering.

Referring to FIGS. 1 and 4–6, when the insertion tool 10 has been positioned in the adapter 86, the pusher 50 is moved in the second direction as indicated by arrow 60 in FIG. 4. This causes the backup ring the O-ring radius 70 to engage and push the upper portion (as viewed in FIG. 5 )the backup ring 80 and the O-ring 82 into the gland 90. As shown in FIG. 1, the hook 62 can enter the slot 28 of the tip 22. Movement of the pusher 50 in the direction of the arrow 60 is limited by engagement of the flat body surface 74 against the second end 20 of the body 12. After insertion of the backup ring 80 and the O-ring 82 has been completed, the insertion tool 10 is removed from the adapter 86. The above-described operation can then be repeated.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. An insertion tool for inserting a backup ring and an O-ring into a gland comprising:

a body including a recess for containing said backup ring and said O-ring;

a protective sleeve positioned on said body; and a pusher movably mounted adjacent to said body, said pusher being moveable in a first direction and a second direction, said pusher including pulling means for pulling said backup ring and said O-ring in said first direction, said pusher further including pushing means for pushing said backup ring and said O-ring in said second direction into said gland.

2. The insertion tool of claim 1, wherein said body includes a tip positioned adjacent to said recess.

3. The insertion tool of claim 2, wherein said tip includes a slot for receiving said pulling means.

4. The insertion tool of claim 1, wherein said body includes a channel, said pusher being positioned in said channel.

5. The insertion tool of claim 1, wherein said first direction is a direction away from said gland, and said second direction is a direction toward said gland.

6. The insertion tool of claim 1, wherein said pulling means is a hook.

7. The insertion tool of claim 1, wherein said pushing means is a backup ring and an O-ring radius for pushing said backup ring and said O-ring.

8. An insertion tool for inserting a backup ring and an O-ring into a gland comprising:

(a) a body including a recess for containing said backup ring and said O-ring;

(b) a protective sleeve positioned on said body adjacent to said recess; and (c) a pusher movably mounted on said body, said pusher being moveable in a first direction and a second direction, said pusher including:

(1) a hook for pulling said backup ring and said O-ring in said first direction; and (2) a backup ring and an O-ring radius for pushing said backup ring in said second direction into said gland.

* * * * *